United States Patent [19]

Tappe et al.

[11] 4,306,874
[45] Dec. 22, 1981

[54] PROCESS FOR PRINTING SYNTHETIC, HYDROPHOBIC FIBER MATERIAL IN ACCORDANCE WITH THE PRINCIPLE OF TRANSFER PRINTING

[75] Inventors: Horst Tappe, Dietzenbach; Claus Schuster, Hofheim, both of Fed. Rep. of Germany

[73] Assignee: Cassella Aktiengesellschaft, Frankfurt, Fed. Rep. of Germany

[21] Appl. No.: 174,732

[22] Filed: Aug. 1, 1980

[30] Foreign Application Priority Data

Aug. 6, 1979 [DE] Fed. Rep. of Germany ....... 2931847

[51] Int. Cl.³ .......................... D06P 5/13; D06P 3/82
[52] U.S. Cl. .......................................... 8/471; 8/529; 8/532; 8/662; 8/918; 8/922
[58] Field of Search ................... 8/471, 532, 662, 918, 8/922, 529

[56] References Cited

U.S. PATENT DOCUMENTS 4,072,462  2/1978  Vellins et al. ............................ 8/471
4,134,723  1/1979  Boyd et al. ............................. 8/532
4,169,705  10/1979 Boyd et al. ............................. 8/532
4,207,069  6/1980  Ono ....................................... 8/471
4,210,412  7/1980  Yamane et al. ......................... 8/471

FOREIGN PATENT DOCUMENTS 858366 3/1978 Belgium .

OTHER PUBLICATIONS

Venkataraman, K., "The Chemistry of Synthetic Dyes" vol. VIII (Academic Press, 1978), p. 192.

Primary Examiner—A. Lionel Clingman
Attorney, Agent, or Firm—Connolly and Hutz

[57] ABSTRACT

A sublimable monoazo dyestuff of the formula

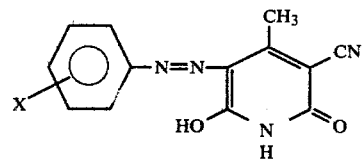

wherein X is alkyl of 1–4 carbon atoms is used as the dyestuff in the process for printing synthetic, hydrophobic materials, treated cellulose materials or materials containing both by transfer printing using formulations containing said sublimable monoazo dyestuff.

3 Claims, No Drawings

PROCESS FOR PRINTING SYNTHETIC, HYDROPHOBIC FIBER MATERIAL IN ACCORDANCE WITH THE PRINCIPLE OF TRANSFER PRINTING

The present invention relates to a process for printing synthetic, hydrophobic fibre material or mixtures of synthetic, organic fibre material containing treated cellulose fibres, and furthermore treated or modified cellulose fibres in accordance with the principle of transfer printing, characterised in that azo dyestuffs of the general formula I

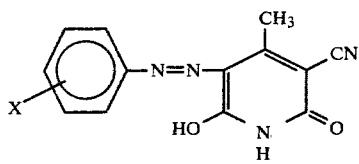

wherein X denotes a straight-chain or branched alkyl group with 1 to 4 carbon atoms, are used as sublimable dyestuffs.

The dyestuffs of the formula I are prepared by processes which are in themselves known, by diazotising an aniline of the formula II

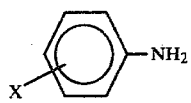

wherein X has the abovementioned meaning, and coupling the resulting diazonium compound with 6-hydroxy-3-cyano-4-methylpyrid-2-one.

It is possible for the dyestuffs of the general formula I and the coupling components to exist in tautomeric forms. Within the scope of the present invention, the tautomeric forms are also represented by the formula I.

The coupling components can be prepared in accordance with the statements of Bobbit and Scola C. J. Org. Chem. 25 560 (1960)), by condensation of ethyl acetoacetate and cyanacetamide in the presence of potassium hydroxide in boiling methanol.

Possible diazo components are o-toluidine, m-toluidine, p-toluidine, 1-amino-2-ethyl-benzene, 1-amino-3-ethyl-benzene, 1-amino-4-ethyl-benzene, 1-amino-2-n-propyl-benzene, 1-amino-3-n-propyl-benzene, 1-amino-4-n-propyl-benzene, 1-amino-2-isopropyl-benzene, 1-amino-3-iso-propyl-benzene, 1-amino-4-isopropylbenzene, 1-amino-2-n-butyl-benzene, 1-amino-3-n-butyl-benzene, 1-amino-4-n-butylbenzene, 1-amino-2-sec.-butyl-benzene, 1-amino-3-sec.-butyl-benzene, 1-amino-4-sec.-butyl-benzene, 1-amino-2-iso-butyl-benzene, 1-amino-3-iso-butyl-benzene, 1-amino-4-iso-butyl-benzene, 1-amino-3-tert.-butyl-benzene and 1-amino-4-tert.-butyl-benzene.

Dyestuffs of the formula III

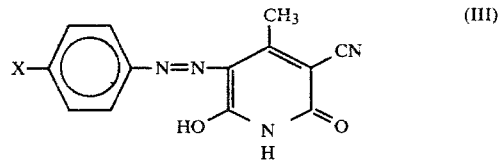

wherein X denotes CH$_3$, C$_2$H$_5$, nC$_3$H$_7$,

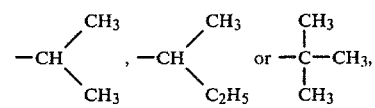

are preferably used, and the dyestuff of the formula IV

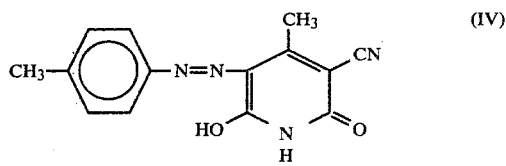

is particularly suitable for the process according to the invention.

The transfer printing process is generally known and has been described, for example, in French Patent Specification Nos. 1,223,330 and 1,334,829. The dyestuffs are applied, for example, in the form of printing inks, such as are described, for example, in French Patent specification No. 1,573,698, or as pastes, to temporary supports, such as paper, other cellulose materials, such as cotton or regenerated cellulose film, metal foils and the like, such as are known from French Patent specification No. 1,575,069, by padding, nip-padding or spraying. The dyestuffs can also be applied to the temporary supports by printing processes using customary printing machines, such as, for example, machines for roller printing, gravure printing, rotary screen printing, flat-bed screen printing, relief printing or flexographic printing. The printing inks are dyestuff solutions or dispersions, if appropriate containing synthetic resins, in suitable, organic solvents, such as, for example, hydrocarbons, benzene, toluene, xylene, chlorinated hydrocarbons, chlorobenzene, chloroform, dichloroethane, trichloroethylene, perchloroethylene, alcohols, ethanol, isopropanol, benzyl alcohol and esters, such as, for example, ethyl acetate, and mixtures thereof.

Compounds which can be used as thickeners are, for example, esterified and/or etherified cellulose derivatives, preferably in combination with alcohol.

In aqueous systems, the dyestuffs are present in a finely dispersed form. The printing pastes prepared therefrom contain thickeners, such as, for example, bean flour derivatives or alginates, or synthetic thickeners.

Substances which are suitable for transfer printing with dyestuffs of the formula I are textile materials consisting of polyester, cellulose triacetate, cellulose 2½-acetate, polyamide, polyacrylonitrile, optionally treated or modified cellulose fibres and mixtures of these fibres, but also non-textile articles, such as films, tapes or blocks of commercially available polymer or polycondensate plastics.

The dyestuffs are sublimed from the temporary support onto the material to be printed, by the action of heat at 140° to 250° C., preferably at 160° to 220° C., for 15 to 60 seconds or longer. The heat action can result from hot air, hot steam, infrared radiation or contact heat, it also being possible to carry out the said processes with application of reduced pressure.

A process for dyeing synthetic textiles by the transfer printing process in which dyestuffs of the formula V

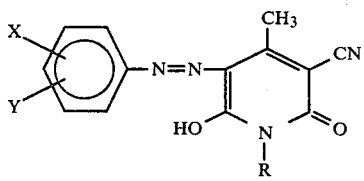

wherein X represents halogen, Y represents hydrogen, halogen, an alkyl group or an alkoxy group and R represents an alkyl group with 1 to 8 carbon atoms, are used, is described in German Offenlegungsschrift No. 2,824,829.

Furthermore, temporary supports carrying the dyestuffs of the general formula VI

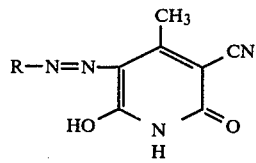

wherein R denotes a benzene radical, are claimed in German Auslegeschrift No. 2,739,174.

From the general teachings of German Auslegeschrift No. 2,739,174, it is not clear whether "benzene radical" is to be understood as only the unsubstituted phenyl radical or as a phenyl radical which is substituted in any desired manner.

In the latter case, this radical can carry up to 5 substituents of any desired type which, apart from the fact that the technical teachings are thus completely indeterminate, can be absolutely unsuitable for the transfer printing process, such as, for example, sulpho groups or $C_{20}$-alkyl groups.

Surprisingly, it has now been found that the dyestuffs of the formula I are particularly suitable for the transfer printing process. They give prints with excellent colour yields, for example on polyester, but also on treated polyester/cotton fibre blends and treated cellulose fibres, and with excellent fastness properties, such as, for example, fastness to light, washing at 40° and 60° C. and heavy water.

Compared with the dyestuffs of the formula VI, mentioned explicitly in German Auslegescrift No. 2,739,174, in which R represents o-chlorophenyl or o-cyanophenyl, the dyestuffs of the formula I are distinguished by an absorption maximum at higher wavelengths, which is particularly desirable in the case of trichromatic printing, and by a greater tinctorial strength in the desired range of longer wavelengths.

Compared with the dyestuffs of the formula V, the dyestuffs of the formula I also have a greater tinctorial strength.

EXAMPLE 1

75 parts of the dyestuff of the formula

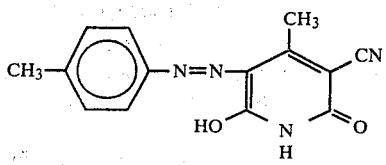

50 g of an anionic dispersing agent, such as, for example, a lignin-sulphonate or a condensation product of naphthalene-sulphonic acid and formaldehyde, and 100 parts of water are converted into a finely divided form by grinding for 8 hours in a ball mill.

50 to 200 parts of the aqueous dispersion thus obtained are made into a paste with 400 parts of a 10% strength carob bean flour ether thickener and 550 to 400 parts of water.

Using this printing paste, paper is printed by the gravure printing process. If this paper is pressed together with a textile of polyester fibres at 200° C. for 15 to 60 seconds, a clear, deep, yellow print with good fastness properties is obtained. The dyestuff of Example 1 was prepared in the following way:

107 parts of p-toluidine in 1,000 parts of water and 240 parts of concentrated hydrochloric acid are diazotised with 75.9 parts of sodium nitrite at 0° to 5° C., the temperature being maintained by adding 1,200 parts of ice; the mixture is subsequently stirred at 0° to 5° C. for 60 minutes. The diazo solution thus prepared is then poured into a solution of 180.6 parts of sodium 6-hydroxy-3-cyano-4-methyl-pyrid-2-one in 4,000 parts of water at 0° to 5° C. in the course of 30 minutes, the temperature being maintained by adding 5,000 parts of ice, and the mixture is subsequently stirred until the diazonium salt can no longer be detected, and the dyestuff is filtered off and washed until free from salts. After drying, 260 g of a yellow dyestuff powder are obtained.

EXAMPLE 2

40 parts of the dyestuff of the formula

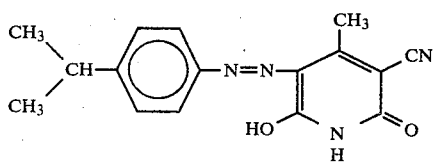

are kneaded with 60 parts of colophony at 100° to 110° C. in a kneader until a completely homogeneous mixture is obtained, and, after cooling, the mixture is ground on one of the customary mills. A finely particulate dyestuff powder is obtained.

100 parts of the 40% strength dyestuff preparation are stirred into 960 parts of varnish (for example a mixture of 20% of colophony-modified maleate resin, 10% of polyvinylbutyral, 65% of ethanol and 5% of ethylglycol). Using the printing ink thus obtained, paper is printed by the gravure printing process. If this paper is pressed together with a fabric of polyester fibres at 200° C. for 15 to 60 seconds, a deep, yellow print with good fastness properties is obtained.

The dyestuff used in this example is obtained when 135 g of p-isopropylaniline are diazotised and the diazo compound is coupled to sodium 6-hydroxy-3-cyano-4- methyl-pyrid-2-one, analogously to the statements in the 2nd part of Example 1.

We claim:

1. In the process for printing synthetic, hydrophobic fiber material, treated cellulose materials, or materials containing both, in accordance with the principle of transfer printing, using formulations of sublimable monoazo dyestuffs free from sulpho groups, the improvement comprises said monoazo dyestuff being of the formula

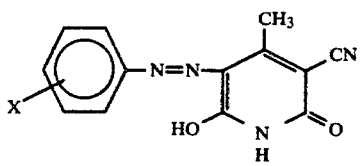

wherein X is a straight-chain or branched alkyl with 1 to 4 carbon atoms.

2. The process according to claim 1, wherein the monoazo dyestuff is of the formula

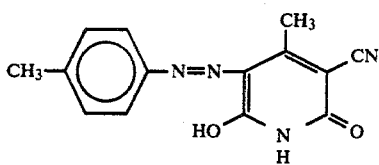

3. The process according to claim 1 wherein the monoazo dyestuff is of the formula

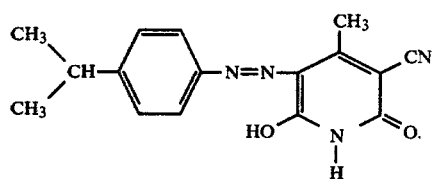

* * * * *